Feb. 5, 1924.
H. J. L. FRANK
SWITCH CONTROL DEVICE
Filed Dec. 29, 1922
1,482,920
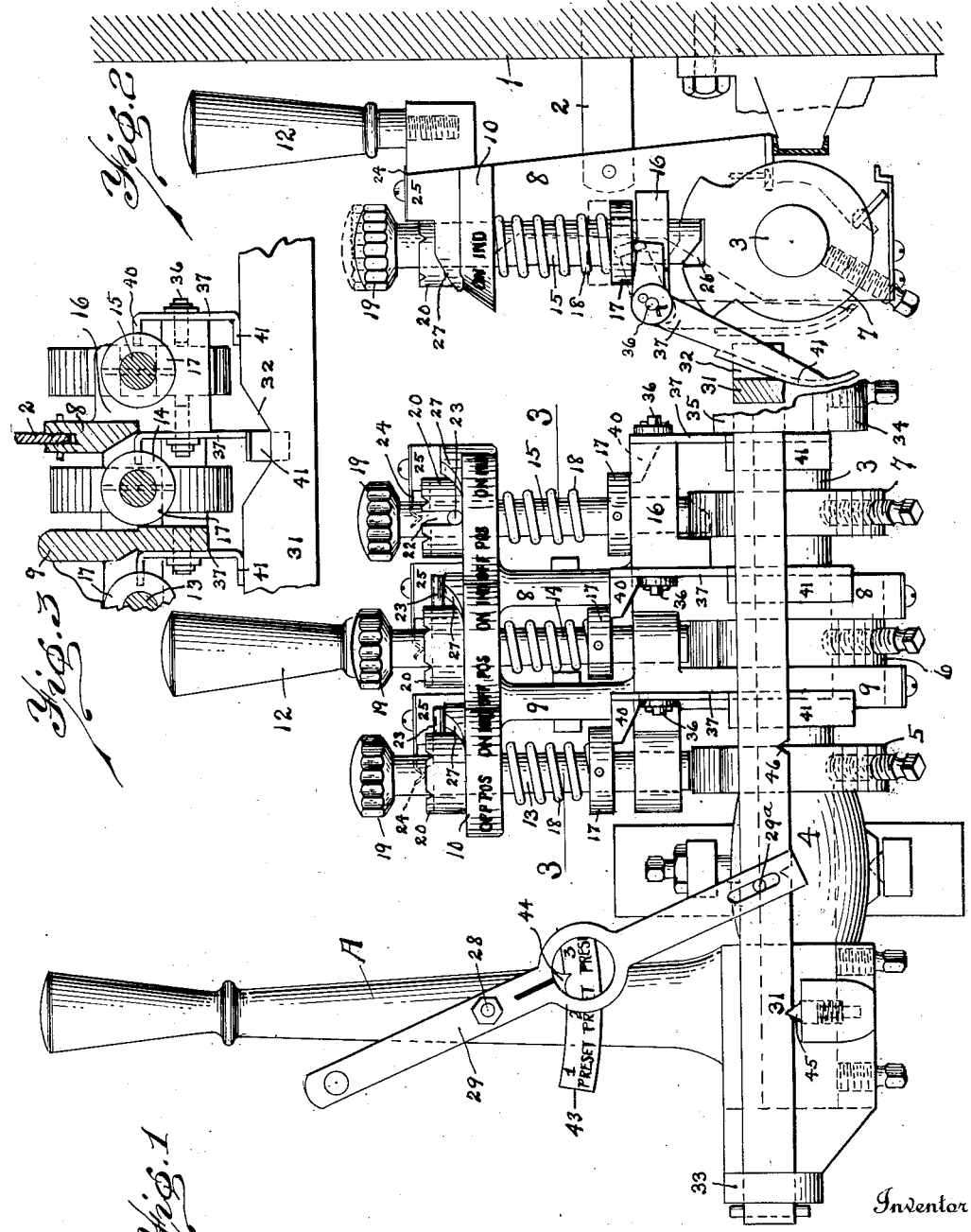
Inventor
H. J. L. Frank
By Edward N. Pagelsen
Attorney Patented Feb. 5, 1924.

1,482,920

UNITED STATES PATENT OFFICE.

HARRISON J. L. FRANK, OF DETROIT, MICHIGAN, ASSIGNOR TO MUTUAL ELECTRIC AND MACHINE COMPANY, OF DETROIT, MICHIGAN, A CORPORATION OF WEST VIRGINIA.

SWITCH-CONTROL DEVICE.

Application filed December 29, 1922. Serial No. 609,561.

*To all whom it may concern:*

Be it known that I, HARRISON J. L. FRANK, a citizen of the United States, and residing at Detroit, in the county of Wayne and State of Michigan, have invented a new and Improved Switch-Control Device, of which the following is a specification.

This invention relates to means for predetermining the lighting of the stages of theaters and other spaces where lights are changed at intervals in the manner illustrated in my co-pending application, Serial No. 510,597, filed October 26, 1921, and its object is to provide a series of operating devices for a switch which can be adjusted in advance without affecting the operation of the switch to predetermine the position of the switch at each of a series of periods, such as scenes or acts of dramatic or operatic presentations.

This invention consists of a shaft and an operating lever therefor, a switch operating link and an arm mounted on the shaft to which the link is connected, a series of adjustable devices for connecting the arm to the shaft, and a selecting device which may be shifted at intervals to control the connections between the arm and shaft.

It also consists in the details of construction illustrated in the accompanying drawing and particularly pointed out in the claims.

In the accompanying drawing, Fig. 1 is a front elevation of an operating unit for one switch and the master lever therefor. Fig. 2 is an end elevation thereof. Fig. 3 is a section on the line 3—3 of Fig. 2.

Similar reference characters refer to like parts throughout the several views.

The switch-board 1 is merely indicated and no switch is shown as any desired type may be employed so long as it can be actuated by a link 2. A shaft 3 is mounted in any desired number of bearings 4 and a master handle A is attached to one end thereof. Attached to this shaft are a series of collars, 5, 6 and 7 for each switch actuating link 2, although this number of collars may be varied as desired, depending upon the number of sets or systems of lighting which are to be used for a performance or act.

The link 2 is connected to a frame consisting of the parallel bars 8 and 9 rotatably mounted on the shaft 3 and the cross bar 10 to which the handle 12 is attached, the switch link 2 being movable by this handle independently of the operating mechanism to be hereafter described. A second cross bar 16 connected to the bars 8 and 9 is perforated to receive the connecting stems 13, 14 and 15 which are also slidable in proper holes in the upper cross bar 10. A spring 18 is mounted on each stem between the collar 17 and the upper cross bar 10 and presses down the stem. A knob 19 at the upper end of each stem permits the operator to lift the stem to turn it.

On each stem is a collar 20 having a longitudinal notch 22 through which extends the pin 23 on the stem. The upper end of each collar 20 is notched and a spring 24 is secured to a boss 25 on the upper cross bar 10 for each collar, to hold the stem from turning. The lower end of each stem is beveled and is adapted to extend into a notch 26 in the collar 5, 6 or 7 below the stem. A cam 27 on the cross bar for each connecting stem permits the small pin 23 extending from the stem to lift and hold the stem entirely out of its notch 26 so that it will not be affected by the rotation of the shaft 3. This is termed the "independent" position of the connecting stem. When the stem is in the position shown in Fig. 2, and the operating handle A is swung outward to turn the shaft 3 to the right, the stem 15 will swing with it and pull the link 2 outward to open the switch. On the return movement of the handle the stem rides up on the rear wall of the notch 26 and the switch remains open.

Mounted on the pin 28 on the handle A is a control lever 29 whose lower end is slotted to receive the pin 29ª carried by the slidable cam bar 31 having a cam notch 32 as shown in Fig. 3. The handle A is preferably provided with a boss 33 in which this cam bar is slidable and a collar 34 is attached to the shaft and is provided with a similar boss 35 to support this bar. Mounted on the pins 36 carried by the cross bar 16 are bell-crank levers 37 provided with fingers 40 adapted to extend under the collars 17 on the connecting stems and with curved ends 41 adapted to be engaged by the cam bar 30.

The operation of this device is as follows:— At any convenient time in advance, the operator positions the stems 13, 14 and 15 for each switch, the stem 13 for the first scene or act, the stem 14 for the second and so on. This he does by turning the knob until the pin 23 is over the word "Off," "Pos," "On" or "Ind." When in the first position, the switch will be positively opened when the operating handle is swung out and left open, as indicated in Fig. 2. When over the letters "Pos" the bevel of the pin will face to the right in Fig. 1 and the link 2 will move back and forth with the handle A. When the pin 23 is over the letters "On," the bevel on the stem is toward the switchboard so that the switch remains in closed position at all times. When the control pin 23 is at the position shown at the right and middle of Fig. 1, the handle 12 can be moved out and in to open or close the switch "independently" of the main handle A which has no effect thereon.

While the unbroken portion of the cam bar is in contact with the curved portion 41 of any bell-crank lever 37, this lever is pushed to the position shown in dotted lines in Fig. 2, and in such position holds the connecting stem controlled thereby out of contact with its collar 5, 6 or 7 so that the handle may be moved back and forth without affecting the switch. But the cam notch 32 permits the curved portion of a bell-crank to swing out and permits the stem to move down into the notch 26 in its collar.

The operator therefore is able to predetermine the position of each switch for each scene. When he swings his selecting lever 29 to indicate that scene or setting on the scale 43 by means of the pointer 44, and then swings his operating handle A back and forth, he closes the switch or opens it or leaves it as it was according to the predetermined scheme of illumination. The stopping points of the movement of the cam bar 31 may be indicated by the spring pressed pin 45 and the notches 46 in the bar.

The number of these stems to a switch, the number of these switches on a shaft and the number of shafts to a switch-board, as well as their details, may all be determined by those skilled in the art without departing from the spirit of my invention as set forth in the following claims.

I claim:—

1. In a switch control device, a shaft and a handle thereon to turn the shaft back and forth, a switch-operating frame rotatably mounted on the shaft, a plurality of collars attached to the shaft, a stem slidable in said frame in alinement with each collar, a spring to move each stem into operative engagement with its collar so that any desired movements of the shaft will be imparted to the switch-operating frame, and means to select the stem to be connected to its collar.

2. In a switch control device, the combination of a shaft and a handle to turn the shaft back and forth, a switch-operating frame rotatable on the shaft, a plurality of stems slidably mounted in said frame, means to move the stems toward the shaft, a collar attached to the shaft in alinement with each stem and having a notch to receive such end, means to prevent the stems from moving toward the shaft, and means to control said means.

3. In a switch control device, the combination of a shaft and a handle to turn the shaft back and forth, a switch-operating frame rotatable on the shaft, a plurality of collars attached to the shaft and having notches in their peripheries, a stem slidably mounted in the frame for each collar, means to force the inner ends of the stems into said notches, levers mounted on the frame to hold the stems out of engagement with the collars, and means to render any one of the levers inoperative.

4. In a switch control device, the combination of a shaft and a handle to turn the shaft back and forth, a switch-operating frame rotatable on the shaft, a plurality of collars attached to the shaft and having notches in their peripheries, a stem slidably mounted in the frame for each collar, means to force the inner ends of the stems into said notches, levers mounted on the frame to hold the stems out of engagement with the collars, and means to render any one of the levers inoperative comprising a bar to normally hold the levers in operative position and having a notch to permit one lever to swing to permit a pin to engage a collar.

5. In a switch control device, the combination of a shaft and a handle to turn the shaft back and forth, a switch-operating frame rotatable on the shaft, a plurality of collars attached to the shaft and having notches in their peripheries, a stem slidably mounted in the frame for each collar, means to force the inner ends of the stems into said notches, levers mounted on the frame to hold the stems out of engagement with the collars, and means to render any one of the levers inoperative comprising a bar to normally hold the levers in operative position and having a notch to permit one lever to swing to permit a pin to engage a collar and a lever to slide the bar longitudinally to cause said notch to register with the selected lever.

6. In a switch control device, a pivotally mounted switch-operating frame, means to swing the frame back and forth, connecting devices to determine the character of movement to be imparted to said frame, and means to select the connecting device.

7. In a switch control device, the combination of a shaft and a handle to turn the shaft back and forth, a switch-operating frame rotatable on the shaft, a plurality of stems adapted to convey the movements of the shaft to the frame, said stems being each adapted to be held in any one of four different positions to determine the character of movements to be imparted to the frame by the shaft, means to hold each of said stems inoperative, and means to select the stem to operatively connect the frame to the shaft.

8. In a switch control device, the combination of a shaft and means to turn the shaft back and forth, a switch-operating frame rotatable on the shaft, a plurality of stems mounted in the frame to cause the frame to move with the shaft, each stem being adapted to be held in any one of a series of positions to determine the character of movement to be imparted by the shaft to the frame, a spring to force each stem toward the shaft, a lever on the frame to hold each stem inoperative, and means to relieve any one of the stems from the action of the lever adjacent thereto.

9. In a switch control device, the combination of a shaft and means to turn the shaft back and forth, a switch-operating frame rotatable on the shaft, a plurality of stems mounted in the frame to cause the frame to move with the shaft, each stem being adapted to be held in any one of a series of positions to determine the character of movement to be imparted by the shaft to the frame, a spring to force each stem toward the shaft, a lever on the frame to hold each stem inoperative, and means to relieve any one of the stems from the action of the lever adjacent thereto comprising a bar to normally hold the levers in operative position and having a notch to permit the spring on a stem to move the adjacent lever to inoperative position.

10. In a switch control device, the combination of a shaft and means to turn the shaft back and forth, a switch-operating frame rotatable on the shaft, a plurality of stems mounted in the frame to cause the frame to move with the shaft, each stem being adapted to be held in any one of a series of positions to determine the character of movement to be imparted by the shaft to the frame, a spring to force each stem toward the shaft, a lever on the frame to hold each stem inoperative, and means to relieve any one of the stems from the action of the lever adjacent thereto comprising a bar to normally hold the levers in operative position and having a notch to permit the spring on a stem to move the adjacent lever to inoperative position and a lever to slide the bar longitudinally to cause said notch to register with the selected lever to permit the operation of a selected stem.

11. In a switch control device, a switch operating mechanism, means to actuate the same comprising a plurality of selective mechanisms, means to render such selective mechanisms inoperative, a control device therefor, and an operating device for said selective mechanisms.

12. In combination, an actuating device, a plurality of selective mechanisms connected thereto, devices to control the operation of said selective mechanisms, means for preventing the operation of predetermined control devices, and an operating device for the combination.

HARRISON J. L. FRANK.